US011486989B2

(12) United States Patent
Johnson

(10) Patent No.: US 11,486,989 B2
(45) Date of Patent: Nov. 1, 2022

(54) SPEED SENSOR CALIBRATION SYSTEMS AND METHODS

(71) Applicant: FLIR Belgium BVBA, Meer (BE)

(72) Inventor: Mark Johnson, Vannes (FR)

(73) Assignee: FLIR Belgium BVBA, Meer (BE)

(*) Notice: Subject to any disclaimer, the term of this patent is extended or adjusted under 35 U.S.C. 154(b) by 87 days.

(21) Appl. No.: 16/823,132

(22) Filed: Mar. 18, 2020

(65) Prior Publication Data

US 2020/0309929 A1 Oct. 1, 2020

Related U.S. Application Data

(60) Provisional application No. 62/826,759, filed on Mar. 29, 2019.

(51) Int. Cl.
| | |
|---|---|
| *G01S 7/52* | (2006.01) |
| *G01C 23/00* | (2006.01) |
| *G01S 19/01* | (2010.01) |
| *G01S 15/58* | (2006.01) |

(52) U.S. Cl.
CPC .......... *G01S 7/52004* (2013.01); *G01C 23/00* (2013.01); *G01S 15/582* (2013.01); *G01S 19/01* (2013.01)

(58) Field of Classification Search
CPC ........ G01S 15/582; G01S 19/01; G01S 15/60; G01S 7/52004; G01S 19/19; G01S 13/9307; G01S 15/93; G01S 17/93; G01S 7/411; G01C 23/00; G01C 21/20; G01C 21/203; G01C 21/00; G08G 3/02; B63B 43/18; G06F 3/017; G06F 3/04812; G06F 3/04817; G06F 3/04842; G06F 3/0486
USPC ................................. 701/21, 301; 715/769
See application file for complete search history.

(56) References Cited

U.S. PATENT DOCUMENTS

| | | | |
|---|---|---|---|
| 4,352,063 A | 9/1982 | Jones et al. | |
| 2016/0125739 A1* | 5/2016 | Stewart | G01C 21/203 701/21 |

FOREIGN PATENT DOCUMENTS

| | | |
|---|---|---|
| EP | 1396702 A | 3/2004 |
| WO | WO 2005054872 | 6/2005 |

* cited by examiner

*Primary Examiner* — Isam A Alsomiri
*Assistant Examiner* — Amie M Ndure
(74) *Attorney, Agent, or Firm* — Haynes and Boone, LLP

(57) ABSTRACT

Techniques are disclosed for systems and methods to provide speed through medium (STM) sensor calibration for mobile structures. An STM sensor calibration system includes a logic device configured to communicate with an STM sensor, an orientation sensor, and a position sensor for a mobile structure. The logic device determines a time series of estimated STM velocities and a time series of speed over ground (SOG) velocities during a dynamic maneuver of the mobile structure. The logic device determines an STM sensor calibration associated with the STM sensor based, at least in part, on the estimated STM velocities and the SOG velocities.

20 Claims, 16 Drawing Sheets

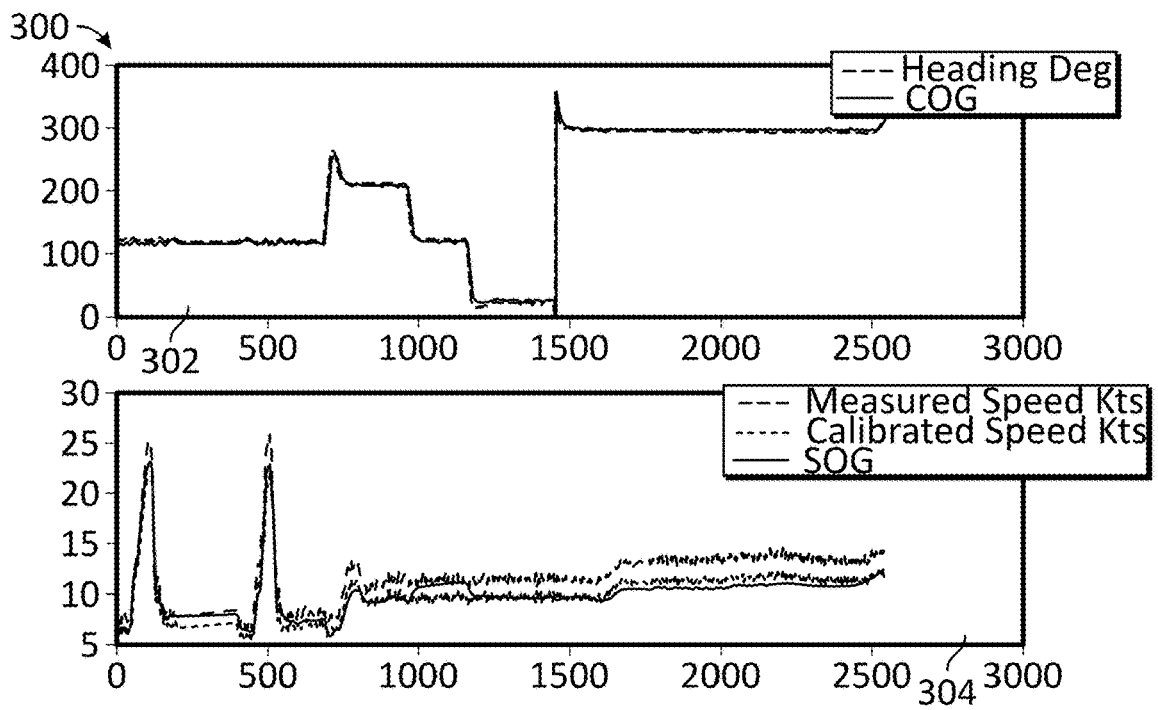
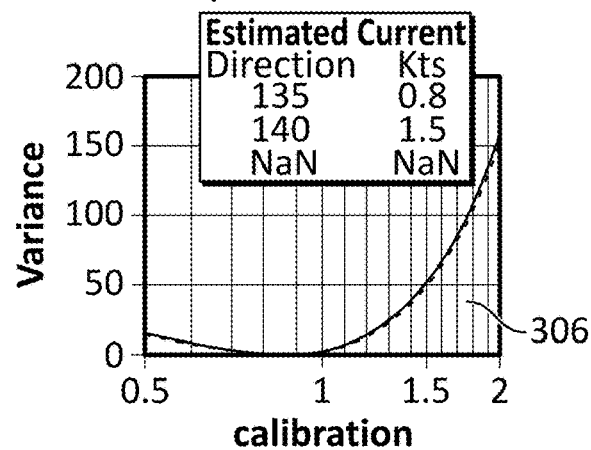
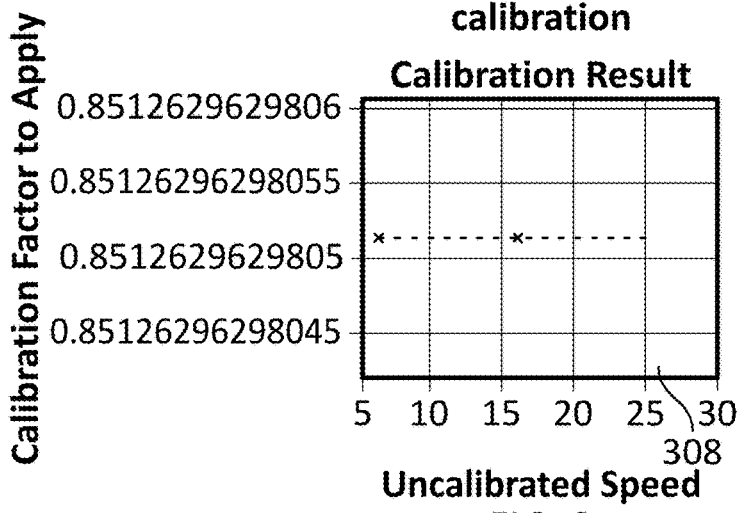
FIG. 3

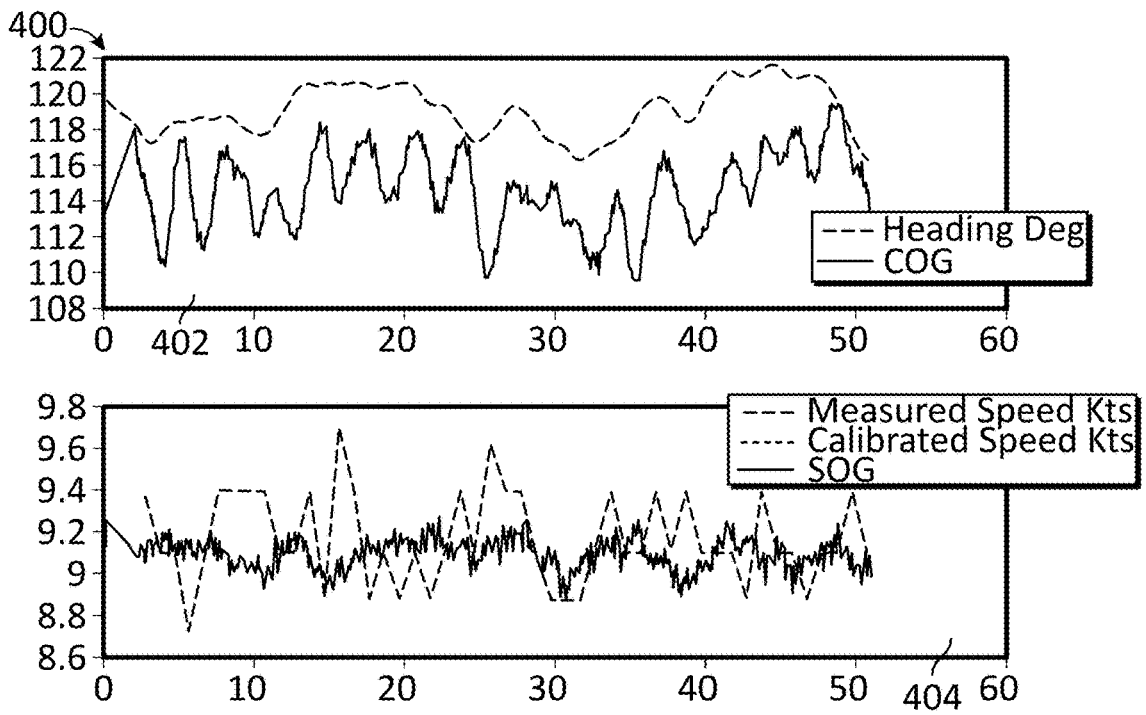
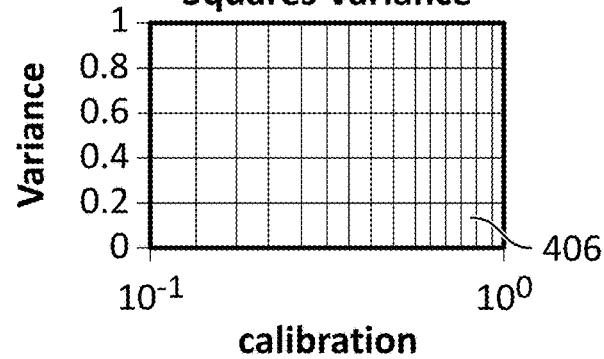
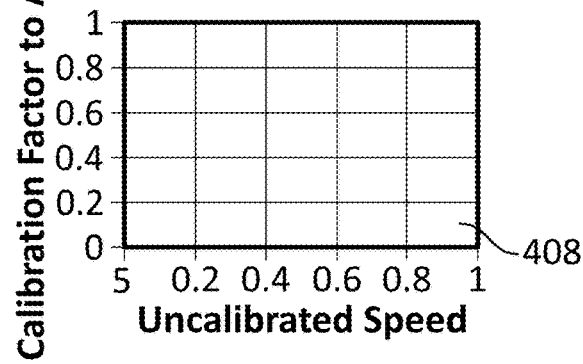
FIG. 4

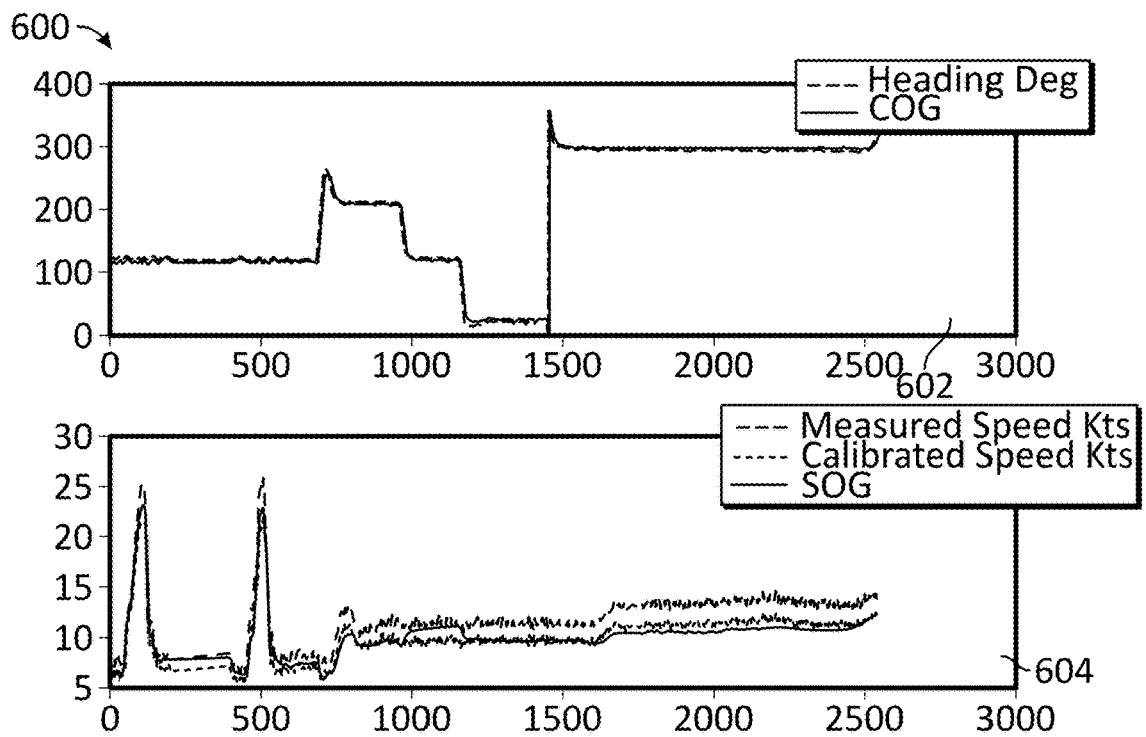
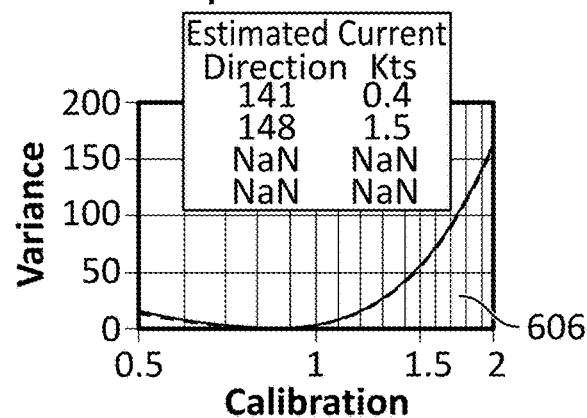
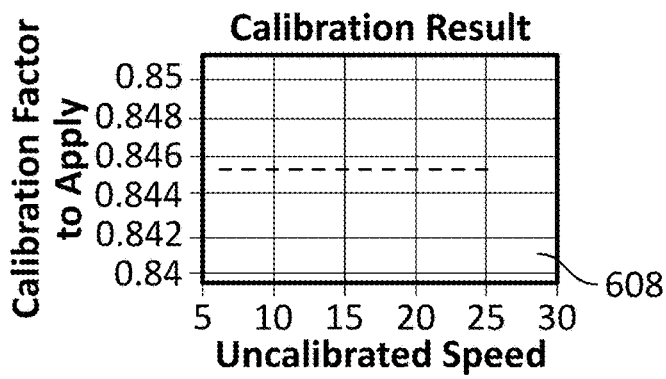
FIG. 6

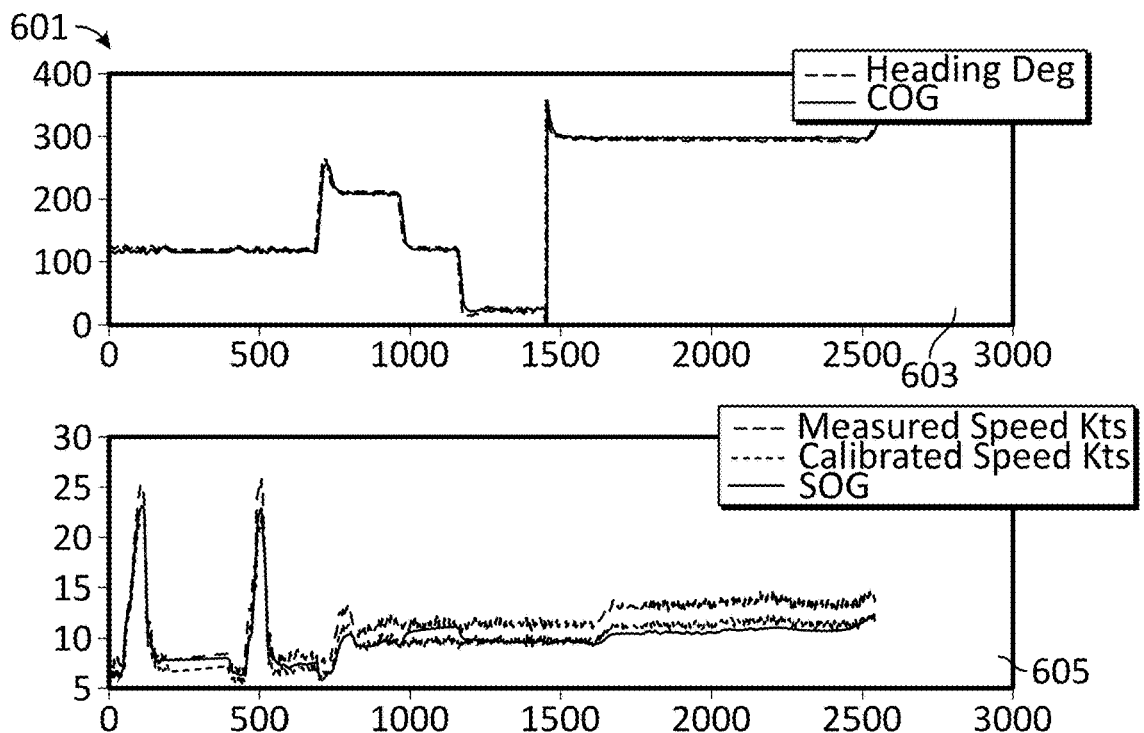
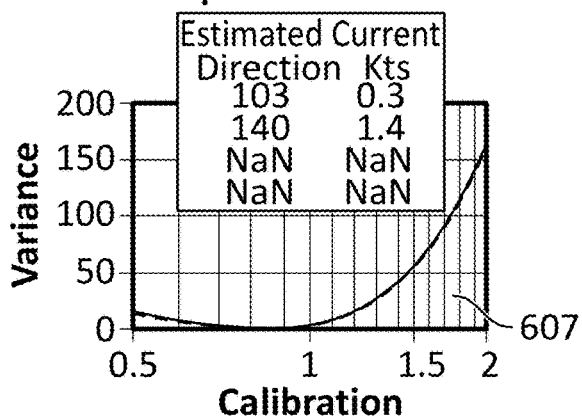
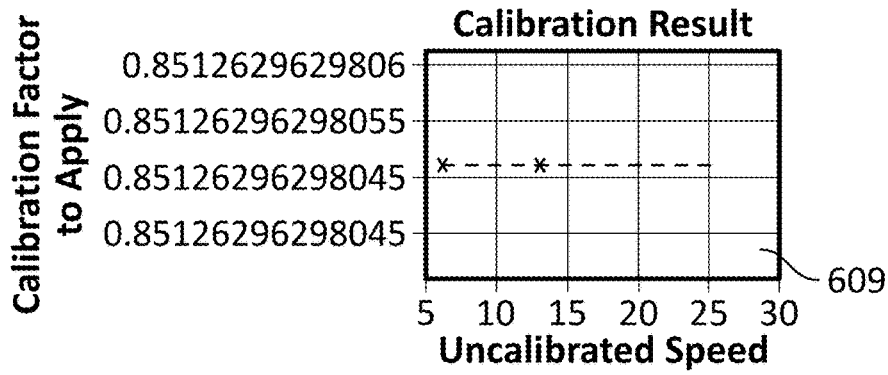
FIG. 6
(Continued)

Auto-calibration by Minimising Least Squares Variance
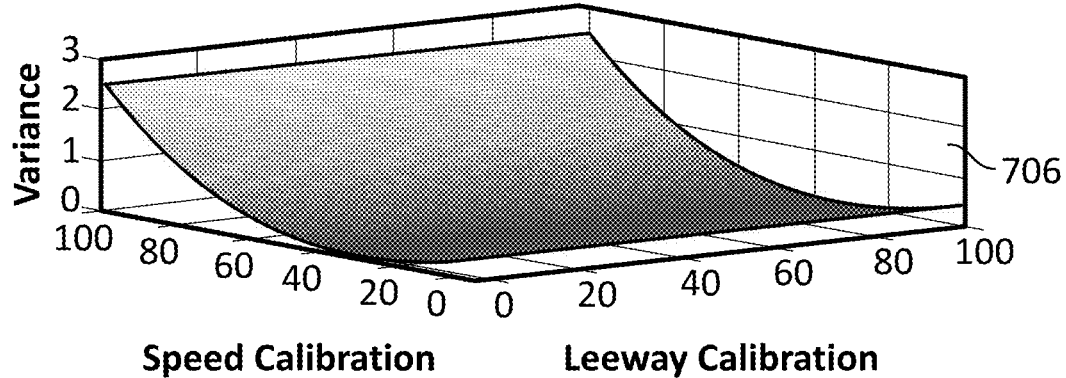
Calibration Result Calibration Error 0.9 and Leeway Factor 5.9
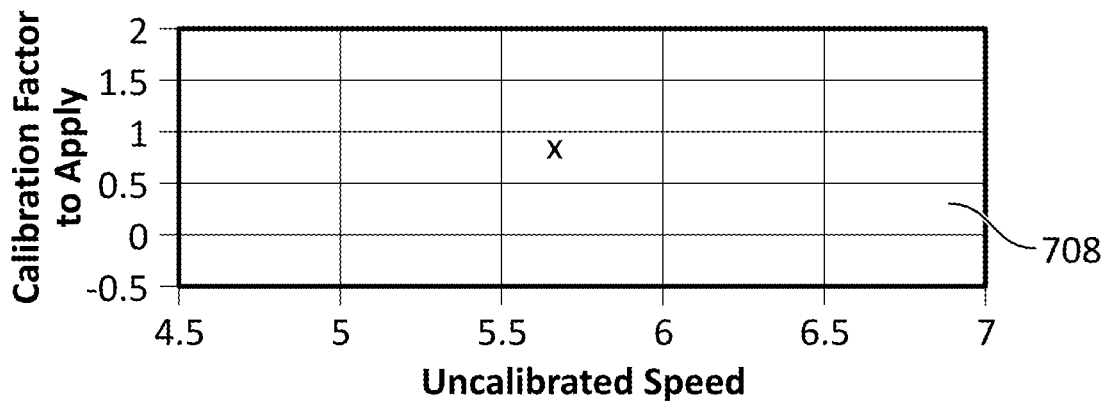
FIG. 7
(Continued)

800

802

```
function Calibration = AutoCal(Measured,NumberOfSpeedBands)
MinNumberOfSamples = 20; MinNumberofSectors = 3; SectorSize_deg = 45;
MaxPolynomialOrder = 3; NumCalPoints = 100;
CalibrationMap_SpdVsCorrection = nan(NumberOfSpeedBands,2);%[set points, calib]
```

804

```
% for every data point, work out the implied current
CalToTry = logspace(log10(0.5), log10(2), NumCalPoints);
for i = 1 : length(CalToTry)
    Boatvelocity_E_N_kts = Pol2cart(Measured.Heading_deg,
CalToTry(i)*Measured.Speed_kts);
    GPSvelocity_E_N_kts = Pol2cart(Measured.GPSCOG_deg, Measured.GPSSOG_kts);
    Current_E_N_kts(:,:,i) = GPSvelocity_E_N_kts - Boatvelocity_E_N_kts;
end
```

806

```
[Idxs,Boundaries] = discretize(Measured.Speed_kts, NumberOfSpeedBands*2);%split into
twice as many bands and overlap a half band to make more use of the data
CalibrationMap_SpdVsCorrection(:,1) = linspace(min(Measured.Speed_kts),
max(Measured.Speed_kts), NumberOfSpeedBands);
TotalCurrentVariance = nan(NumCalPoints, NumberOfSpeedBands);
MeanCurrent = nan(2, NumberOfSpeedBands);
```

808

```
for Band = 1 : NumberOfSpeedBands
    LowerBand = max(Band*2-2, 1);  UpperBand = min(Band*2+1, NumberOfSpeedBands);
    Usable = Idxs>=LowerBand & Idxs<=UpperBand & Measured.Speed_kts>1 &
Measured.GPSSOG_kts>1;
    CurrentInThisSpeedRegion = Current_E_N_kts(:,Usable,:);
    EnoughData = size(CurrentInThisSpeedRegion,2) > MinNumberOfSamples;
    sector_hits = sort(histcounts(round(Measured.Heading_deg(Usable)/
SectorSize_deg)), 'descend');
    EnoughManouvering = length(sector_hits)>=MinNumberofSectors &&
sector_hits(MinNumberofSectors)>MinNumberOfSamples;
    if EnoughData && EnoughManouvering
        CurrentVariance = var(squeeze(CurrentInThisSpeedRegion),0,2,'omitnan');%N&E
        TotalCurrentVariance(:,Band) = squeeze(sum(CurrentVariance,1));%N+E
        [~, idx] = min(TotalCurrentVariance(:,Band));
        CalibrationMap_SpdVsCorrection(Band,2) = CalToTry(idx);
        Current = mean(CurrentInThisSpeedRegion(:,:,2),2);%N+E
        [set, drift] = cart2pol(Current(1), Current(2));
        MeanCurrent(:,Band) = [mod(round(set*180/pi),360); round(drift*10)/10];
    end
end
```

FIG. 8A

801 

810 

```
idxs2use = ~isnan(CalibrationMap_SpdVsCorrection(:,2));
if sum(idxs2use) > 1
    PolynomialOrderToUse = round(min(sum(idxs2use)/2-1, MaxPolynomialOrder));
    Calibration = polyfit( CalibrationMap_SpdVsCorrection(idxs2use,1), ...
        CalibrationMap_SpdVsCorrection(idxs2use,2), PolynomialOrderToUse);
else
    Calibration = mean(CalibrationMap_SpdVsCorrection(Band,2),'omitnan');
end function [Speeds, Values] = GeneratePlot(Calibration, CalibrationMap_SpdVsCorrection)
Speeds = linspace(CalibrationMap_SpdVsCorrection(1,1),
CalibrationMap_SpdVsCorrection(end,1),20);
Values = polyval(Calibration, Speeds);
end
```

```
function Calibration = AutoCal(Measured,NumberOfSpeedBands)
MinNumberOfSamples = 20; MinNumberofSectors = 3; SectorSize_deg = 45;
MaxPolynomialOrder = 3; NumCalPoints = 100;
CalibrationMap_SpdVsCorrection = nan(NumberOfSpeedBands,3); %[set points, cal, leeway]
```

904

```
% for every data point, work out the implied current
SpeedCalToTry = logspace(log10(0.8), log10(1.2), NumCalPoints);
LeewayFactorToTry = linspace(0, 10, NumCalPoints);
for i = 1 : NumCalPoints
    for j = 1 : NumCalPoints
        SpeedCalibrated = SpeedCalToTry(i) * Measured.Speed_kts;
        HeadingMadeGood = Measured.Heading_deg + Leeway(Measured.HeelAngle_deg,
LeewayFactorToTry(j), Measured.Speed_kts);
        Boatvelocity_E_N_kts =
Pol2cart(HeadingMadeGood+0*(rand(1,length(HeadingMadeGood))-0.5), SpeedCalibrated);
        GPSvelocity_E_N_kts =  Pol2cart(Measured.GPSCOG_deg, Measured.GPSSOG_kts);
        % create matrix of all possible estimates for current with four dimensions:
        % Easterly and Northerly components
        % One estimate for each data point in the dataset provided
        % The number of calibration trials for boat speed calibration
        % The number of calibration trials for the leeway factor
        Current_E_N_kts(:,:,i,j) = GPSvelocity_E_N_kts - Boatvelocity_E_N_kts;
    end
end
```

```
[Idxs,Boundaries] = discretize(Measured.Speed_kts, NumberOfSpeedBands*2); %split into
twice as many bands and overlap a half band to make more use of the data
CalibrationMap_SpdVsCorrection(:,1) = linspace(min(Measured.Speed_kts),
max(Measured.Speed_kts), NumberOfSpeedBands);
TotalCurrentVariance = nan(NumCalPoints, NumCalPoints, NumberOfSpeedBands);
MeanCurrent = nan(2, NumberOfSpeedBands);
```

908

```
for Band = 1 : NumberOfSpeedBands
    LowerBand = max(Band*2-2, 1); UpperBand = min(Band*2+1, NumberOfSpeedBands);
    Usable = Idxs>=LowerBand & Idxs<=UpperBand & Measured.Speed_kts>1 &
Measured.GPSSOG_kts>1;
    CurrentInThisSpeedRegion = Current_E_N_kts(:,Usable,:,:);
    EnoughData = size(CurrentInThisSpeedRegion,2) > MinNumberOfSamples;
    sector_hits = sort(histcounts(round(Measured.Heading_deg(Usable)/
SectorSize_deg)), 'descend');
    EnoughManouvering = length(sector_hits)>=MinNumberofSectors &&
sector_hits(MinNumberofSectors)>MinNumberOfSamples;
    if EnoughData && EnoughManouvering
        CurrentVariance = squeeze(var(CurrentInThisSpeedRegion,0,2,'omitnan')); %N&E
        TotalCurrentVariance(:,:,Band) = squeeze(sum(CurrentVariance,1)); %N&E
        TotalCurrentVariance4Band = squeeze(TotalCurrentVariance(:,:,Band));
        [~, idx] = min(TotalCurrentVariance4Band(:));
        [I,J] = ind2sub(NumCalPoints, idx);
        CalibrationMap_SpdVsCorrection(Band,2) = SpeedCalToTry(I);
        CalibrationMap_SpdVsCorrection(Band,3) = LeewayFactorToTry(J);
        Current = mean(CurrentInThisSpeedRegion(:,:,2),2); %N&E
        [set, drift] = cart2pol(Current(1), Current(2));
        MeanCurrent(:,Band) = [mod(round(set*180/pi),360); round(drift*10)/10];
    end
end
```

FIG. 9B

SPEED SENSOR CALIBRATION SYSTEMS AND METHODS

CROSS REFERENCE TO RELATED APPLICATIONS

This application claims the benefit of and priority to U.S. Provisional Patent Application No. 62/826,759 filed Mar. 29, 2019 and entitled "SPEED SENSOR CALIBRATION SYSTEMS AND METHODS," which is incorporated herein by reference in its entirety.

TECHNICAL FIELD

One or more embodiments of the invention relate generally to speed sensor calibration and more particularly, for example, to systems and methods for substantially automatic speed sensor calibration.

BACKGROUND

Conventional speed sensors for mobile structures (aircraft, watercraft, automobiles) mechanically interact with the environment, measure some aspect of that mechanical interaction, and convert such measurements into an estimated speed, typically relative to an environmental medium through which the mobile structure is traveling. This may generally be referred to as the mobile structure's speed through medium (STM), such as through water or air. For example, a paddlewheel, piezoelectric, and/or ultrasonic based water speed sensor may be configured to measure a ship's longitudinal speed through water (STW), and a pitot tube may be used to measure an aircraft's or terrestrial vehicle's longitudinal speed through air (STA).

Contemporary mobile structures often include a GNSS configured to provide a measured position of a mobile structure, and a series of such measurements may be used to estimate the mobile structure's speed over ground (SOG) (e.g., an absolute speed of the mobile structure). While such GNSS-derived SOGs are typically accurate, estimated speeds provided by speed sensors, such as a watercraft's STW, typically require calibration from mobile structure to mobile structure because medium flow about a mobile structure can vary both according to the speed of the mobile structure through the medium and according to the shape and/or orientation of the mobile structure relative to the predominate flow of the medium.

For example, the particular position or orientation of a water speed sensor placed on the hull of a watercraft, the shape of the hull, a present heel angle (e.g., for sailboats) of the watercraft, can all impact a calibration between STW and SOG, and so the calibration between STM and SOG for one mobile structure isn't reliably transferrable to another mobile structure, even if identical speed sensors are used. In addition, currents in the environmental medium can present an unknown offset between STM and SOG and can complicate any calibration between STM and SOG. Thus, there is a need for improved calibration methodologies between STMs and SOGs for mobile structures.

SUMMARY

Techniques are disclosed for systems and methods to provide speed through medium (STM) sensor calibration for a mobile structure. In accordance with one or more embodiments, an STM sensor calibration system may include a logic device, a memory, one or more sensors, one or more actuators/controllers, and modules to interface with users, sensors, actuators, and/or other modules of a mobile structure. The logic device may be configured to determine an STM sensor calibration associated with an STM sensor based, at least in part, on a time series of estimated STM velocities and speed over ground (SOG) velocities. These and other control signals may be displayed to a user and/or used to adjust a steering actuator, a propulsion system thrust, and/or other operational systems of the mobile structure.

In various embodiments, an STM sensor calibration system may include a logic device configured to communicate with a speed through medium (STM) sensor configured to provide a longitudinal speed of a mobile structure through an environmental medium, an orientation sensor configured to provide an absolute orientation of the mobile structure, and a position sensor configured to provide an absolute position and/or a Doppler-derived velocity of the mobile structure. The logic device may be configured to determine a first time series of estimated STM velocities of the mobile structure based, at least in part, on longitudinal speeds provided by the STM sensor and absolute orientations provided by the orientation sensor during a dynamic maneuver of the mobile structure; determine a second time series of speed over ground (SOG) velocities of the mobile structure based, at least in part, on position sensor data (e.g., absolute positions and/or Doppler-derived velocities) provided by the GNSS receiver during the dynamic maneuver of the mobile structure; and determine an STM sensor calibration associated with the STM sensor based, at least in part, on the first time series of estimated STM velocities and the second time series of SOG velocities.

In some embodiments, a method to provide STM sensor calibration for a mobile structure may include receiving longitudinal speeds of a mobile structure through an environmental medium from an STM sensor, absolute orientations of the mobile structure from an orientation sensor, and position sensor data (e.g., absolute positions and/or Doppler-derived velocities) of the mobile structure from a position sensor; determining a first time series of estimated STM velocities of the mobile structure based, at least in part, on the longitudinal speeds provided by the STM sensor and the absolute orientations provided by the orientation sensor during a dynamic maneuver of the mobile structure; determining a second time series of SOG velocities of the mobile structure based, at least in part, on the position sensor data provided by the GNSS receiver during the dynamic maneuver of the mobile structure; and determining an STM sensor calibration associated with the STM sensor based, at least in part, on the first time series of estimated STM velocities and the second time series of SOG velocities.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3-7 show performance graphs for an STM sensor calibration system in accordance with an embodiment of the disclosure.

FIGS. 8A-9B illustrate processes to provide STM sensor calibration in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, speed through medium (STM) sensor calibration systems and methods may provide techniques to accurately and reliably calibrate an STM sensor in the presence of an unmeasured medium current (e.g., an air or water current) without necessitating stopping the mobile structure to which it is mounted, and without necessitating user intervention. Moreover, embodiments provide a reliable and accurate technique to characterize a localized medium current, and a series of such characterizations may be used to generate a medium current chart to aid in navigation generally.

One or more embodiments of the described STM sensor calibration system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops to control navigation of the mobile structure during an STM sensor calibration process.

In the context of marine applications, users often find STM sensor calibration difficult because tidal current can provide an offset between speed through water (STW, a type of STM) and speed over ground (SOG), through a vector triangle, as described herein. Furthermore, a single scale factor may not work well enough across the entire speed range and so calibration is ideally performed at multiple speeds. On some watercraft, the calibration process can be further complicated by other dependencies, for example sailboats usually have their water speed sensor mounted off the centerline and this typically makes the water flow differently on port tack vs. starboard tack vs. downwind. The result is that most watercraft operate with incorrectly calibrated speed sensors, with errors typically around 10% to 20%. This can cause confusion and create incorrect reporting of distance travelled (e.g., many electronic logs work by integrating speed). For racing sailboats, incorrect speed sensor calibration ripples through situational awareness of the sailboat and the race, including resulting in incorrect true wind speed and angle and incorrect target boat speed.

Figure 1A:
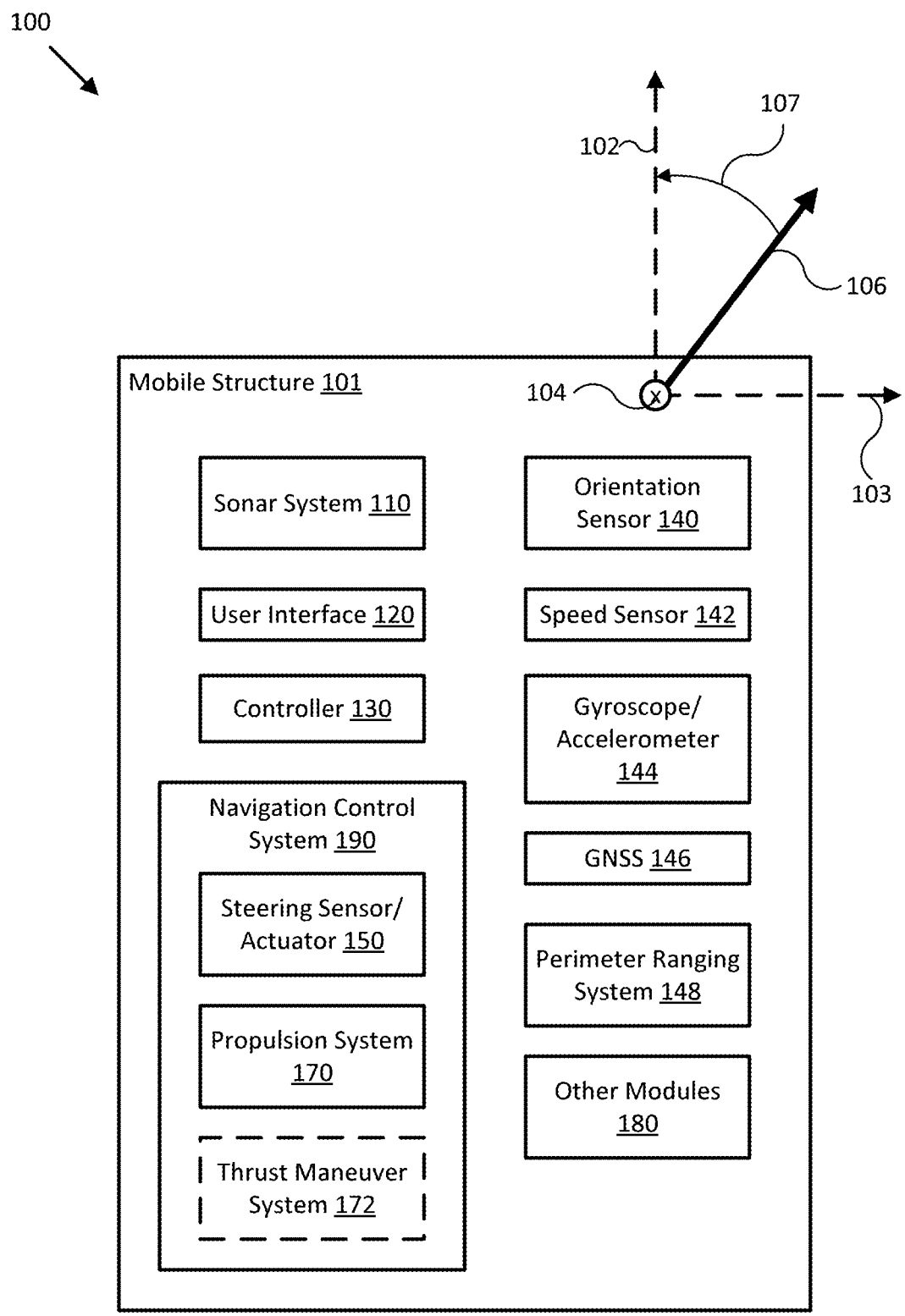
FIG. 1A illustrates a block diagram of a mobile structure including a speed through medium (STM) sensor calibration system in accordance with an embodiment of the disclosure.

FIG. 1A illustrates a block diagram of an STM sensor calibration system 100 in accordance with an embodiment of the disclosure. In various embodiments, system 100 may be adapted to provide STM sensor calibration for a particular mobile structure 101. In some embodiments, system 100 may be adapted to measure an orientation, a position, and/or a velocity of mobile structure 101. System 100 may then use these measurements to provide STM sensor calibration, which may then be used to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide STM sensor calibration for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water velocity impacting mobile structure 101. In various embodiments, system 100 may include multiple embodiments of speed sensor 142, such as one wind velocity sensor and one water velocity sensor. In various embodiments, speed sensor 142 may be referred to as an STM sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 (e.g., a position sensor) based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control. In additional embodiments, GNSS 146 may be configured to provide a Doppler-derived absolute velocity measurement directly that is derived from a GNSS receiver (e.g., GNSS 146) to satellite Doppler shift measurable at and by GNSS 146, such as that described in U.S. Provisional Patent Application 62/672,541 filed May 16, 2018 and entitled "GNSS SYSTEMS AND METHODS," which is incorporated herein by reference in its entirety.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10 s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101).

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

Figure 1B:
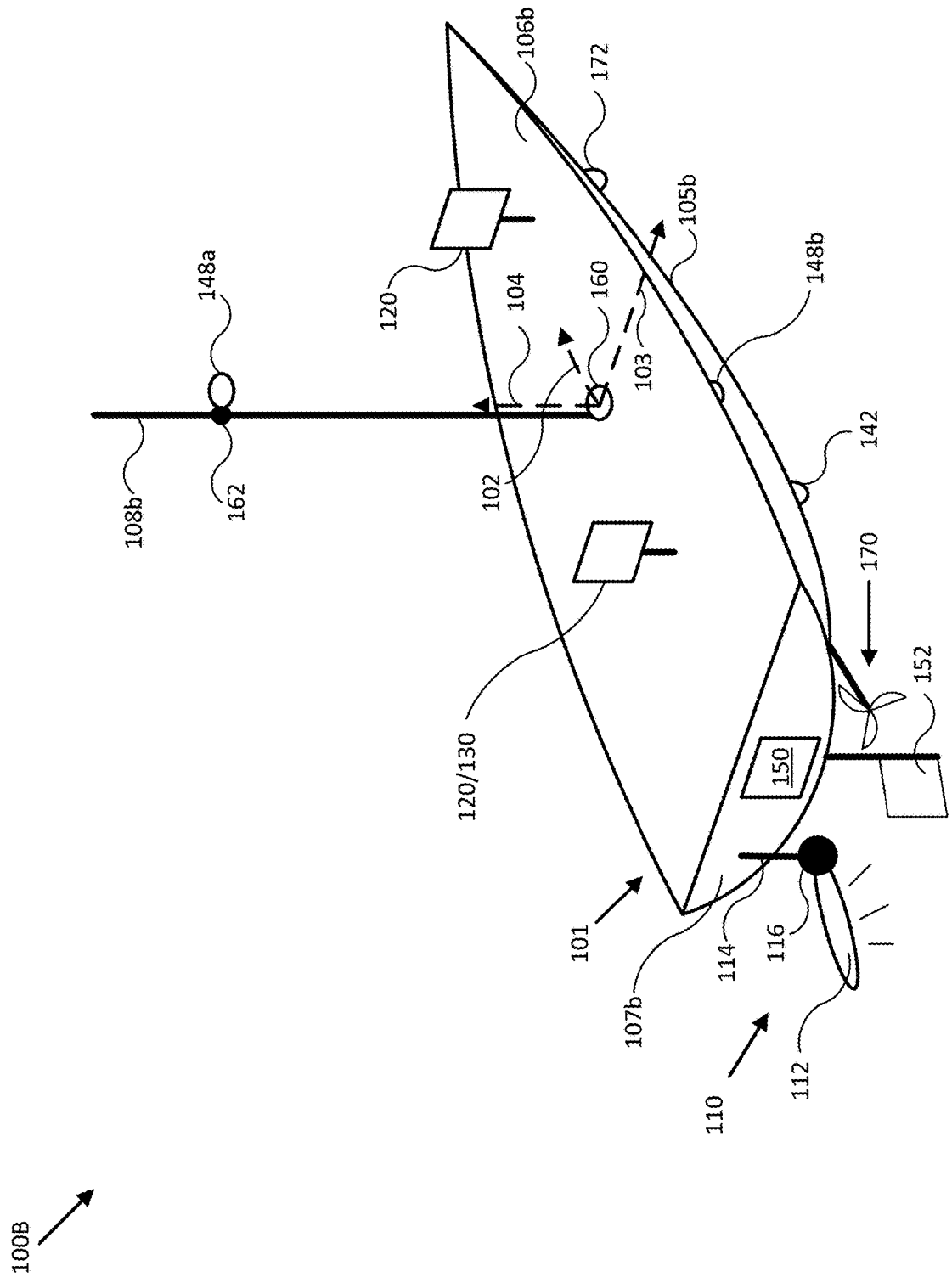
FIG. 1B illustrates a diagram of a watercraft including an STM sensor calibration system in accordance with an embodiment of the disclosure.
Figure 1C:
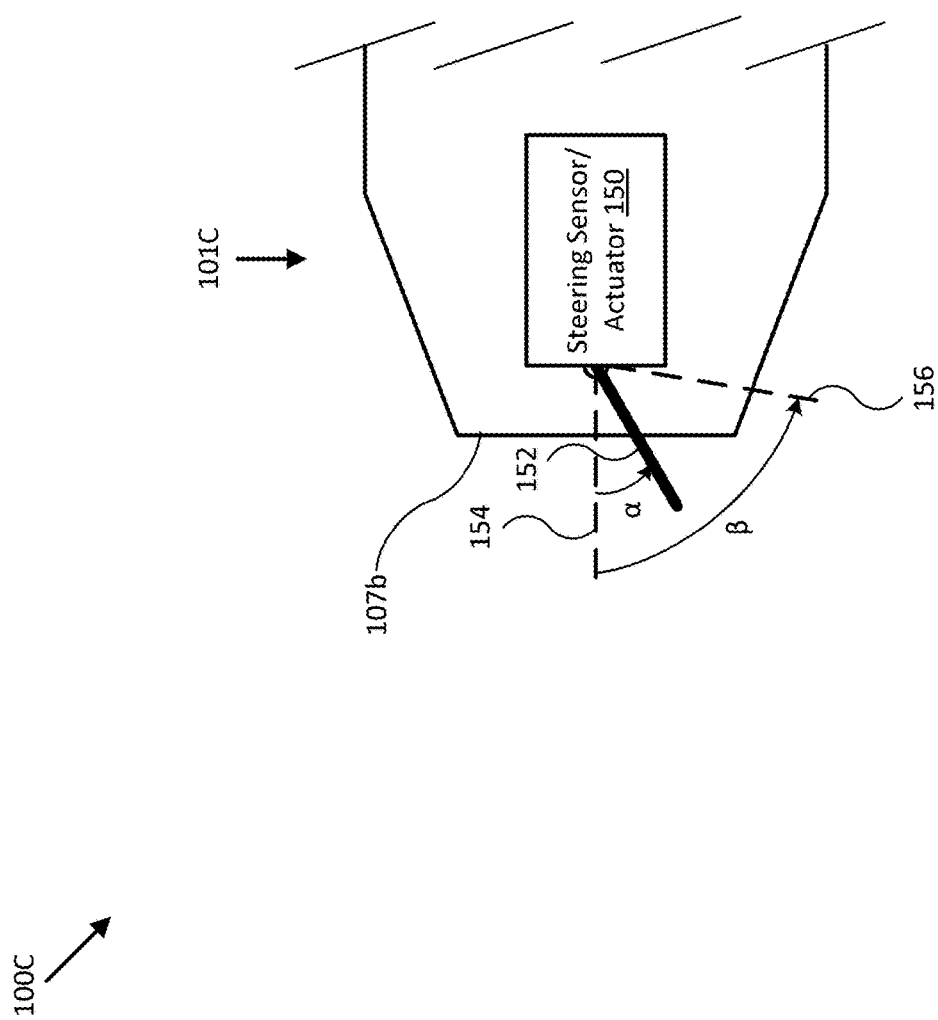
FIG. 1C illustrates a diagram of a steering sensor/actuator for an STM sensor calibration system in accordance with an embodiment of the disclosure.

For example, FIG. 1C illustrates a diagram of a steering sensor/actuator for an STM sensor calibration system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 154). In various embodiments, steering sensor/actuator 150 may be implemented with a steering actuator angle limit (e.g., the positive limit is designated by an angle $\beta$ and a dashed line 156 in FIG. 1C), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular navigation maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle $\alpha$ to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide STM sensor calibration and/or additional operational control of mobile structure 101, similar to system 100 of FIG. 1B. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148 according to control signals and/or an orientation or position of mobile structure 101 provided by user interface/controller 120/130. For example, user interface/controller 120/130 may be adapted to receive an orientation of transducer assembly 112 and/or perimeter ranging system 148 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed, such as a STM or STW sensor configured to measure the relative speed of mobile structure 101 through a surrounding water medium, substantially along longitudinal axis 102. In some embodiments, speed sensor 142 may be adapted to provide a relatively thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
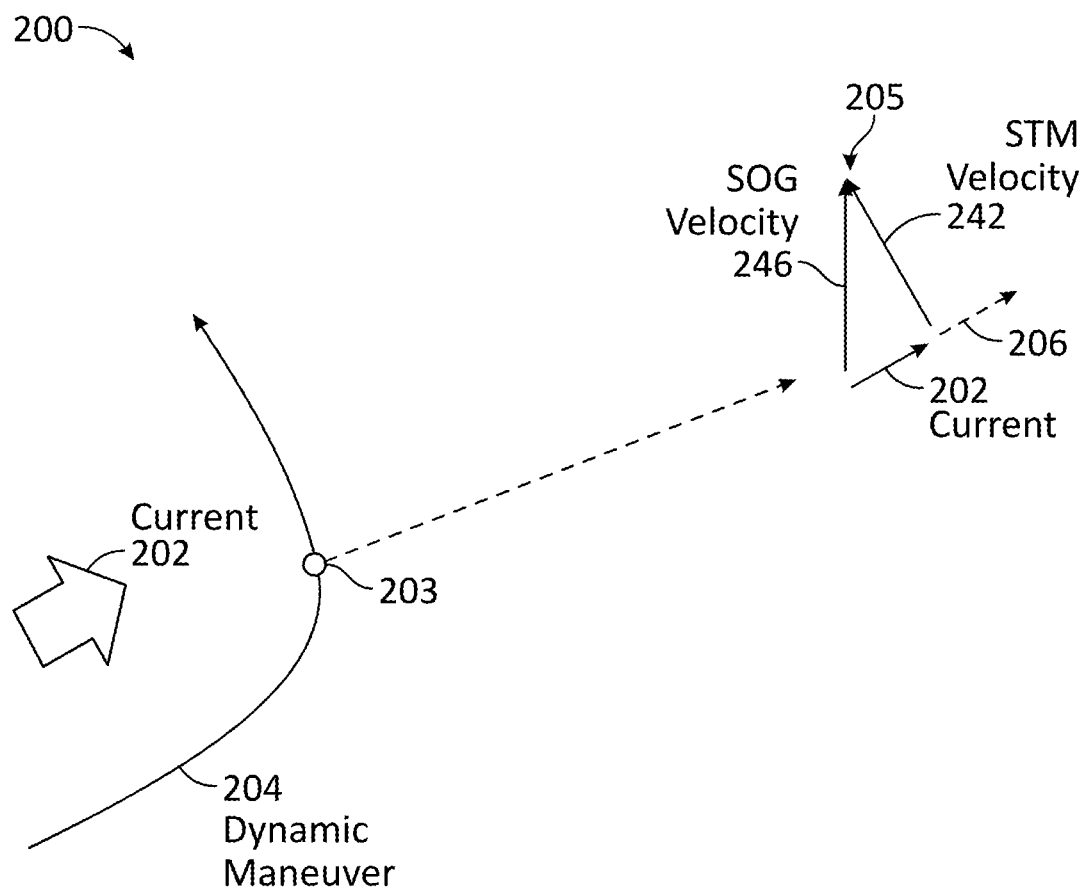
FIG. 2 shows a kinematic diagram illustrating motion of a mobile structure through a medium with a prevailing current, as measured by an STM sensor calibration system in accordance with an embodiment of the disclosure.

FIG. 2 shows a kinematic diagram 200 illustrating motion of mobile structure 101 through a medium (e.g., air, or water) with a prevailing medium current 202, as measured by STM sensor calibration system 100 in accordance with an embodiment of the disclosure. In FIG. 2, kinematic diagram shows the path of mobile structure 101 along dynamic maneuver 204 in the presence of prevailing medium current 202. Point 203 illustrates the kinematics associated with mobile structure 101 in the form of a vector triangle 205 that exists in some form for each point along dynamic maneuver 204, with the hypotenuse of vector triangle 205 being an SOG velocity 246 associated with mobile structure 101 at point 203, one component of vector triangle 205 being a medium current 202, and the remaining component of vector triangle 205 being an STM velocity 242, as shown.

At used herein, speed over ground (SOG) velocity 246 is the magnitude and direction of the velocity of mobile structure 101 referenced to ground. For example, SOG velocity 246 may be determined by measuring successive absolute positions of mobile structure 101 (e.g., provided by GNSS 146), vector subtracting the least recent position from the most recent position, and dividing the result by the time period it took mobile structure 101 to travel between the successive absolute positions. Speed through medium (STM) velocity 242 is the magnitude and direction of the velocity of mobile structure 101 through an environmental medium, where the direction is referenced to the same coordinate frame as that used for SOG velocity 246. For example, STM velocity 242 may be determined according to measurements provided by speed sensor 142 (e.g., providing a magnitude) and orientation sensor 140 (e.g., providing a direction). Medium current 202 is the absolute velocity of the environmental medium (e.g. air or water) through which mobile structure 101 is maneuvering, referenced to the same coordinate frame as that used for SOG velocity 246. Leeway velocity 206 is the magnitude and direction of a lateral velocity of mobile structure 101 generated by the shape of mobile structure 101 as it traverses dynamic maneuver 204, where the direction is always orthogonal to STM velocity 242, and as such, can be derived from STM velocity 242. Leeway velocity 206 is described more fully herein with reference to FIG. 7.

In embodiments described herein, medium current 202 may be defined as the vector difference between SOG velocity 246 and STM velocity 242, assuming that speed sensor 142 is functioning properly and accurately calibrated. Moreover, as defined herein, a "dynamic maneuver" is understood as any maneuver (e.g., any combination of accelerations, decelerations, and heading changes) of mobile structure 101 that occur temporally quickly enough and/or spatially localized enough that medium current 202 is substantially constant over the duration of the dynamic maneuver. For example, such dynamic maneuver may include a 90 degree turn or tack over approximately 30 seconds, or any typically sailing tack or combination of tacks over a similar time period. Accordingly, the stated relationship between medium current 202, SOG velocity 246, and STM velocity 242 holds for all individual points along dynamic maneuver 204.

Embodiments of STM sensor calibration system 100 may be configured to use this relationship to determine an STM sensor calibration for speed sensor (STM sensor) 142. For example, if speed sensor 142 is incorrectly calibrated, then an estimated medium current (determined according to the relationship provided herein) will appear to vary at each point along dynamic maneuver 204. Embodiments are able to determine an accurate STM sensor calibration by identifying a particular STM sensor calibration (e.g., a gain, set of gains, and/or a gain curve used to adjust a raw speed measurement provided by speed sensor 142) that minimizes the medium current variance across a series of SOG velocities and STM velocities measured across dynamic maneuver 204.

If speed sensor 142 is taken to have a linear calibration over the typical STMs experienced by mobile structure 101, then the STM sensor calibration may be implemented as a calibration gain that may be multiplied by a raw STM sensor measurement provided by speed sensor 142 to produce a calibrated STM for mobile structure 101. If the speed sensor is considered to have a non-linear calibration over the typical STMs experienced by mobile structure 101, then the range of typical STMs may be segregated into a plurality of speed bands selected such that within each individual speed band, the calibration is assumed to be substantially linear, and a corresponding plurality of STM sensor calibration gains is determined, one for each speed band separately. In some embodiments, the set of calibration gains may be used to create a continuous STM sensor calibration across the full range of typical STMs for mobile structure 101 by interpolation, polynomial fitting, and/or other techniques, such as generating a calibration curve across the full range of typical STMs for mobile structure 101.

FIGS. 3-7 show performance graphs for STM sensor calibration system 100 in accordance with an embodiment of the disclosure. For example, performance graph 300 in FIG.

3 includes heading/direction excursion graph 302, speed/magnitude excursion graph 304, variance graph 306, and calibration graph 308. As can be seen from heading excursion graph 302 and speed excursion graph 304, from time zero to 700, the heading of mobile structure 101 is constant with two bursts of speed, and the direction and magnitude excursions between the STM velocity and the SOG velocity are almost negligible. Then, mobile structure 101 executes a square at a substantially constant and relatively increased speed, and the magnitude excursion between the STM velocity and the SOG velocity becomes more pronounced. From time 1500 onwards, the heading of mobile structure 101 is constant with only small changes in a relatively elevated speed, and the magnitude excursion between the STM velocity and the SOG velocity becomes further pronounced. Variance plot 306 shows how the medium current variance within two different speed bands varies according to a single calibration gain value each, and calibration plot 308 shows the two calibration gain values plotted against uncalibrated speed (e.g., raw speed measurements provided by speed sensor 142).

From performance graph 300, it can be seen that there is insufficient data to produce a high-speed calibration (e.g., the heading does not change during the two speed bursts). At lower speed bands, there is sufficient information, and system 100 is able determine that speed sensor 132 is overreading in at least two speed bands, needing an 0.85 calibration gain in each, and system 100 is able to use the calibration gains to estimate that that environmental medium current runs predominately southeast at approximately 1.1 Kts.

Performance graph 400 in FIG. 4 includes heading/direction excursion graph 402, speed/magnitude excursion graph 404, variance graph 406, and calibration graph 408. As can be seen from heading excursion graph 402 and speed excursion graph 404 (and the empty variance graph 406 and calibration graph 408), the maneuver navigated by mobile structure 101 did not have enough variation in heading (approximately 4 degrees), and so no calibration results are possible.

Figure 5:
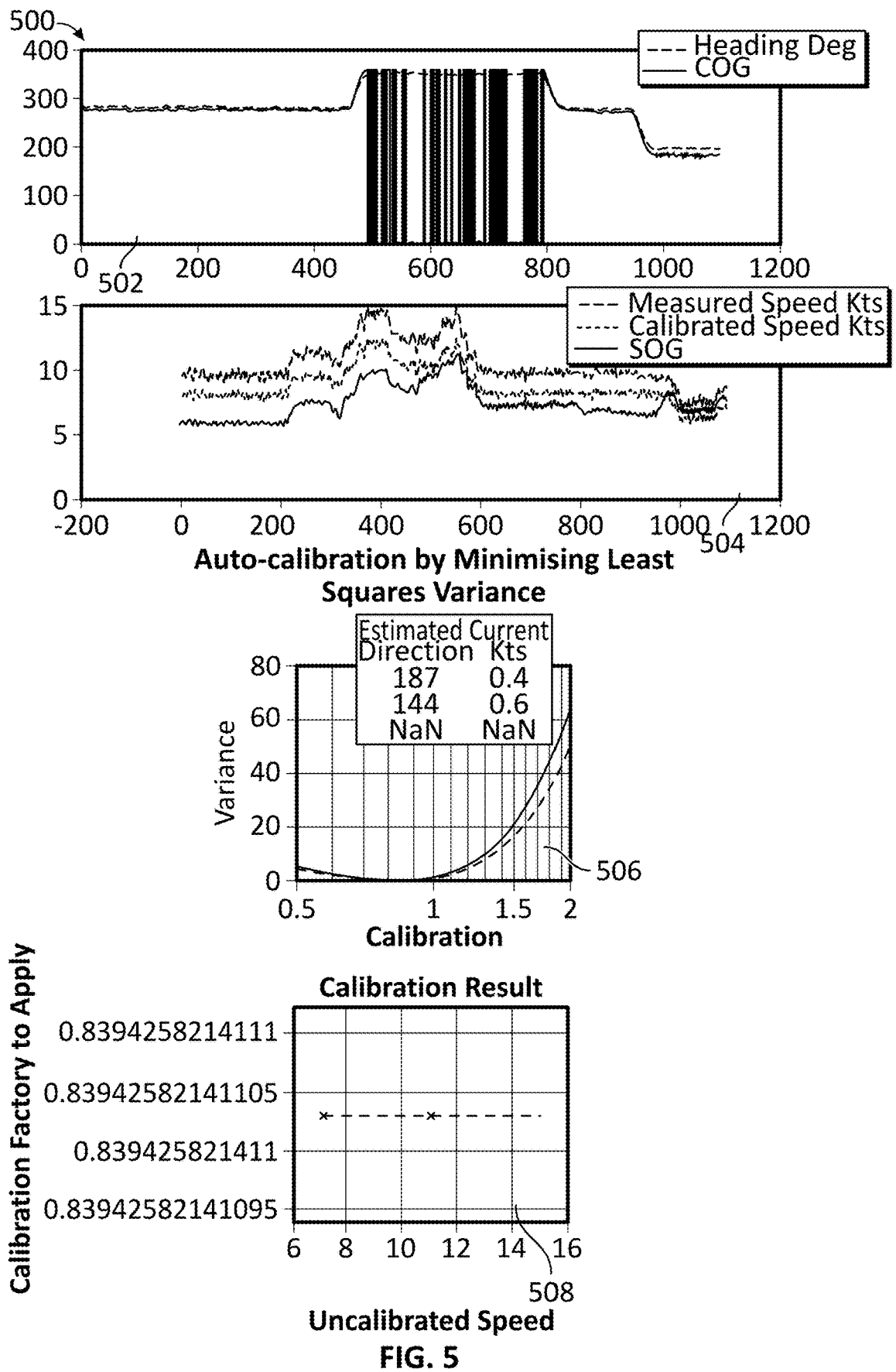

Performance graph 500 in FIG. 5 includes heading/direction excursion graph 502, speed/magnitude excursion graph 504, variance graph 506, and calibration graph 508. As can be seen from heading excursion graph 502 and speed excursion graph 504, the maneuver navigated by mobile structure 101 did not have enough variation in heading at high speed for high speed band calibration results, but did have enough information in the lower speed bands such that system 100 is able to determine an 0.84 calibration gain in each of the lower speed bands, and system 100 is able to use the calibration gains to estimate that that environmental medium current runs predominately south, southeast at approximately 0.5 Kts.

Under typical conditions, heading errors of up to 2 degrees are fairly common. Performance graph 600 in FIG. 6 includes heading/direction excursion graph 602, speed/magnitude excursion graph 604, variance graph 606, and calibration graph 608, and performance graph 600 in FIG. 6 includes heading/direction excursion graph 603, speed/magnitude excursion graph 605, variance graph 607, and calibration graph 609, where performance graph 600 is the result assuming no heading error, and performance graph 601 is the result after application of a +−5 degree first harmonic heading error (e.g., 5*cosd (Heading Deg). As can be seen from the various graphs, embodiments are robust against such errors and system 100 is able to determine a relatively stable (e.g., 0.845 vs. 0.851) calibration gain in each of the lower speed bands, as shown.

Embodiments may be adapted to provide both an STM sensor calibration and a leeway calibration, where the leeway calibration compensates for lateral velocities of mobile structure 101 caused by the interaction of the shape of mobile structure 101 (e.g., the shape of the hull of a watercraft, the shape of the rudder, wings, and fuselage of an aircraft) and the environmental medium, when there is a non-zero STM. For example, in the case where mobile structure 101 is a watercraft, the interaction of hull 105b or a keel protruding from 105b with water can cause a lateral force that results in a lateral "leeway velocity" (e.g., leeway velocity 206 in FIG. 2) as mobile structure 101 navigates dynamic maneuver 204. Such leeway velocity is always orthogonal to STM velocity 242. One common model for such leeway velocity may be: leeway velocity=(K*heel angle)/(STM speed)^2, where K is a leeway calibration (e.g., a gain in this model) specific to the shape of mobile structure 101, and where the heel angle is the roll angle of mobile structure 101 about longitudinal axis 102 and away from vertical axis 104.

Leeway velocity 206 may be related to the other components of vector triangle 205 such that: medium current 202=vector difference (SOG velocity 246−STM velocity 242−leeway velocity 206)−assuming an accurate/properly calibrated STM velocity 242 and an accurate/properly calibrated leeway velocity 206. As with the STM sensor calibration, the leeway calibration (e.g., K) may similarly be varied to minimize the medium current variance across dynamic maneuver 204. As such, system 100 may be configured to vary both the STM sensor calibration and the leeway calibration to identify a specific two dimensional STM sensor calibration and leeway calibration pair corresponding to a global minimum medium current variance over dynamic maneuver 204.

Figure 7:
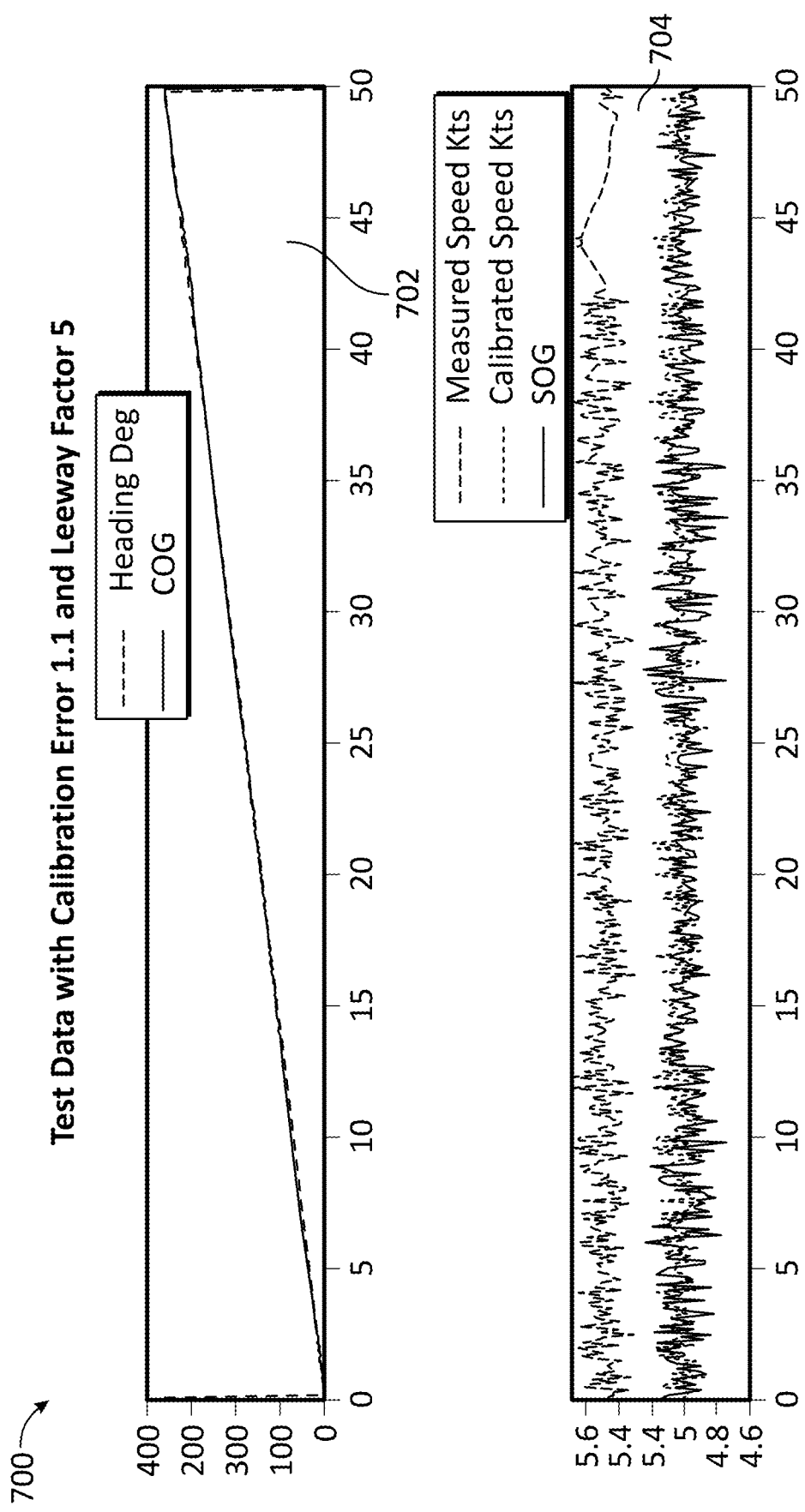

Performance graph 700 in FIG. 7 includes heading/direction excursion graph 702, speed/magnitude excursion graph 704, variance graph 706, and calibration graph 708. As can be seen from the various graphs, the maneuver navigated by mobile structure 101 did has sufficient variation in heading within a single speed band to allow system 100 to identify a two dimensional minimum of the medium current variance at 0.9 STM sensor calibration and 5.9 leeway calibration (compare to a simulated imposed 1.1 STM sensor calibration and 5.0 leeway calibration), as shown in variance graph 706 and specified in calibration graph 708.

FIGS. 8A-9B illustrate processes to provide STM sensor calibration in accordance with embodiments of the disclosure, which may be implemented as one or more blocks of executable script and/or program code, as shown. For example, process 800 in FIG. 8A includes initialization block 802, time series medium current block 804, speed band segregation block 806, and calibration block 808 and may be configured to provide an STM sensor calibration and a corresponding medium current (e.g., direction and speed) based on various received sensor measurements, as described herein. Initialization block 802 may be configured to initialize various variables to receive a time series of STM measurements, orientation measurements, position measurements, and/or other sensor measurements and facilitate operation of other blocks of process 800 and/or other processes of FIGS. 8A-9B.

Time series medium current block 804 may be configured to determine a time series of estimated medium currents corresponding to the time series of various sensor measurements received in block 802. Speed band segregation block 806 may be configured to generate a plurality of speed bands and allocate or link various sensor measurements received in block 802 and/or estimated medium currents determined in block 804 to appropriate speed bands. Calibration block 808 may be configured to determine an STM sensor calibration and a localized medium current based on the sensor measurements received in block 802, the time series of estimated medium currents determined in block 804, and/or according to the speed bands generated in block 806.

Process 801 in FIG. 8B includes curve generator block 810 and performance graph block 812. Curve generator block 810 may be configured to generate a calibration curve based on the STM sensor calibration determined in calibration block 808 of FIG. 8A and/or the speed bands generated in block 806. Performance graph block 812 may be configured to generate any of the performance graphs described herein, in order to visualize the STM sensor calibration provided by calibration block 808, for example, or the calibration curve generated in block 810.

Processes 900 and 901 in FIGS. 9A-B may be configured to provide an STM sensor calibration, a leeway calibration, and a corresponding medium current (e.g., direction and speed) based on various received sensor measurements, as described herein. Process 900 in FIG. 9A includes initialization block 902 and time series medium current block 904. Initialization block 902 is similar to initialization block 801 of FIG. 8A and may be configured to initialize various variables to receive a time series of STM measurements, orientation measurements (e.g., including roll or heel angle measurements), position measurements, and/or other sensor measurements and facilitate operation of other blocks of process 900 and/or other processes of FIGS. 8A-9B. Time series medium current block 904 is similar to time series medium current block 804 and may be configured to determine a time series of estimated medium currents corresponding to the time series of various sensor measurements received in block 902.

Process 901 in FIG. 9B includes speed band segregation block 906 and calibration block 908. Speed band segregation block 906 is similar to speed band segregation block 806 in FIG. 8A and may be configured to generate a plurality of speed bands and allocate or link various sensor measurements received in block 902 and/or estimated medium currents determined in block 904 to appropriate speed bands. Calibration block 908 is similar to calibration block 808 in FIG. 8A and may be configured to determine an STM sensor calibration, a leeway calibration, and a localized medium current based on the sensor measurements received in block 902, the time series of estimated medium currents determined in block 904, and/or according to the speed bands generated in block 906. In some embodiments, blocks similar to curve generator block 810 and performance graph block 812 may be used to generate one or more calibration curves and/or surfaces based on the STM sensor calibration and the leeway calibration determined in calibration block 808 and/or to generate any of the performance graphs described herein, in order to visualize the STM sensor calibration and leeway calibration provided by calibration block 908, for example, or calibration curves and/or surfaces generated in a block similar to block 810.

Figure 10:
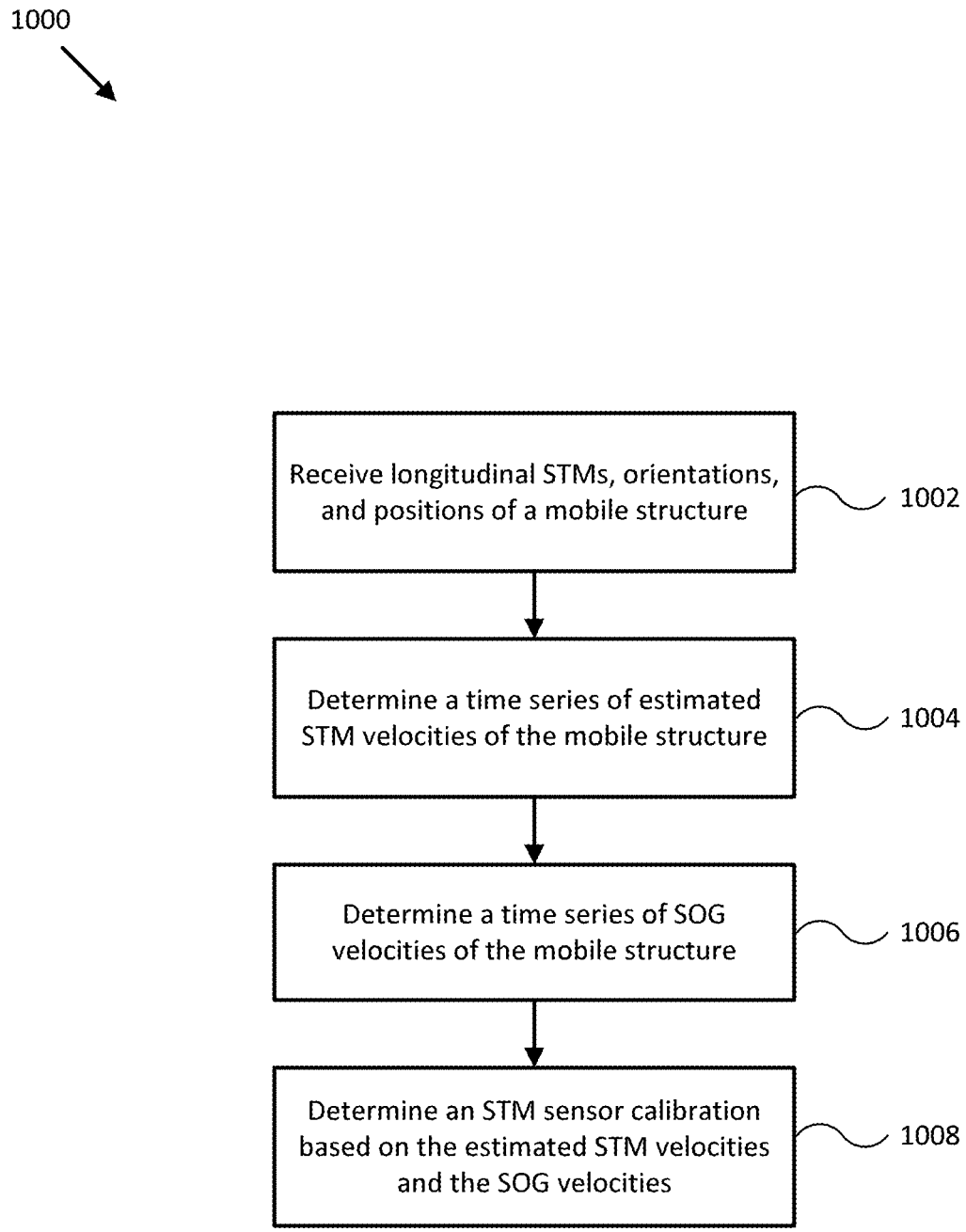
FIG. 10 illustrates a flow diagram of a process to provide STM sensor calibration for a mobile structure in accordance with an embodiment of the disclosure.

FIG. 10 illustrates a flow diagram of a process 1000 to provide STM sensor calibration for mobile structure 101 in accordance with an embodiment of the disclosure. It should be appreciated that any step, sub-step, sub-process, or block of process 1000 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems, processes, control loops, and images described in reference to FIGS. 1A-9, process 1000 may be performed by other systems different from those systems, processes, control loops, and images and including a different selection of electronic devices, sensors, assemblies, mobile structures, and/or mobile structure attributes, for example.

In block 1002, longitudinal STMs, orientations, and/or positions of a mobile structure are received. For example, controller 130 may be configured to receive a time series of raw air or water speeds from speed sensor 142 corresponding to a longitudinal direction of motion of mobile structure 101, a time series of absolute orientations or headings of mobile structure 101 from orientation sensor 140, and/or a time series of absolute positions of mobile structure 101 from GNSS 146. In some embodiments, controller 130 may be configured to receive a time series of roll or heel angles of mobile structure 101 from orientation sensor 140 and/or gyroscope/accelerometer 144. All such sensor measurements may be received during a dynamic maneuver of mobile structure 101, and the duration of the dynamic maneuver may be detected and/or set based on the various sensor measurements.

More generally, controller 130 may be configured to receive any of a variety of sensor measurements from the various elements of system 100, for example, including user input provided to user interface, such as user input to initiate a dynamic maneuver involving manipulation of one or more elements of navigation control system 190. In other embodiments, controller 130 may be configured to initiate a dynamic maneuver automatically upon a predetermined maximum calibration duration elapsing, for example, or upon detecting a present STM sensor calibration (e.g., associated with one or more speed bands) is outside a threshold variance relative to a prior STM sensor calibration (e.g., associated with the same one or more speed bands). Upon such detection, controller 130 may be configured to control user interface 120 to generate an audible and/or visible calibration excursion alert for presentation to a user of mobile structure 101.

In further embodiments, controller 130 may be configured to verify an operational status of orientation sensor 140 prior moving to blocks 1004, 1006, and/or 1008. For example, orientation sensor 140 may be configured to report its calibration status in the form of a percent of calibration, and controller 130 may be configured to halt process 1000 if the calibration status of orientation sensor 140 is less than 100%, for example, or less than 80%. Orientation sensor 140 may also be configured to report a fault status, and controller 130 may be configured to halt process 1000 if the fault status is reported.

In block 1004, a time series of estimated STM velocities of a mobile structure is determined. For example, controller 130 may be configured to determine a time series of estimated STM velocities of mobile structure 101 based, at least in part, on the longitudinal speeds provided by speed sensor 142 (e.g., the STM sensor) and the absolute orientations/headings provided by orientation sensor 140 and received in block 1002 during a dynamic maneuver of mobile structure 101.

In additional embodiments, controller 130 may be configured to determine a time series of leeway velocities based, at least in part, on the longitudinal speeds provided by speed sensor 142, the absolute orientations/headings provided by orientation sensor 140, and heel angles provided by orientation sensor 140 and/or gyroscope/accelerometer 144 and received in block 1002 during a dynamic maneuver of mobile structure 101.

In block 1006, a time series of SOG velocities of a mobile structure is determined. For example, controller 130 may be configured to determine a time series of SOG velocities of mobile structure 101 based, at least in part, on the absolute positions provided by GNSS 146 (e.g., a position sensor) and received in block 1002 during a dynamic maneuver of mobile structure 101.

In block 1008, an STM sensor calibration is determined. For example, controller 130 may be configured to determine an STM sensor calibration associated with the STM sensor based, at least in part, on the time series of estimated STM velocities determined in block 1004 and the time series of SOG velocities determined in block 1006.

In some embodiments, controller 130 may be configured to determine a time series of estimated medium currents based, at least in part, on the first series of estimated STM velocities determined in block 1004 and the second series of SOG velocities determined in block 1006. Controller 130 may then determine or identify (e.g., via least squares fitting techniques or similar) the STM sensor calibration that minimizes a medium current variance associated with the time series of estimated medium currents and the dynamic maneuver of the mobile structure. Controller 130 may then determine a localized medium current (e.g., a localized air or water current) corresponding to or associated with the dynamic maneuver of mobile structure 101 based, at least in part, on the time series of estimated medium currents and the STM sensor calibration.

In other embodiments, controller 130 may be configured to segregate and/or allocate the time series of estimated STM velocities determined in block 1004 and the time series of SOG velocities determined in block 1006 into a plurality of speed bands associated with the longitudinal speeds of mobile structure 101 received in block 1002. For example, controller 130 may be configured to split the range of longitudinal speeds into a set number of speed bands, regardless of the range, or may be configured to apply predetermined speed bands (e.g., predetermined minimum and maximum limits for each speed band) to the received longitudinal speeds. In such embodiments, controller 130 may be configured to determine the STM sensor calibration based, at least in part, on the time series of estimated STM velocities, the time series of SOG velocities, and the plurality of speed bands, wherein the STB sensor calibration comprises a plurality of calibration gains corresponding to the plurality of speed bands (e.g., one each for each speed band). In some embodiments, controller 130 may be configured to generate a calibration curve based on the plurality of calibration gains, for example.

In embodiments where controller 130 has determined a time series of leeway velocities, controller 130 may be configured to determine the STM sensor calibration associated with the STM sensor (speed sensor 142) and a leeway calibration associated with mobile structure 101 based, at least in part, on the time series of estimated STM velocities determined in block 1004, the time series of SOG velocities determined in block 1006, and the time series of leeway velocities, as described herein. For example, controller 130 may be configured to determine a time series of estimated medium currents based, at least in part, on the series of estimated STM velocities and the series of SOG velocities, and to then determine and/or identify the combination STM sensor calibration and leeway calibration that minimizes a medium current variance associated with the time series of estimated medium currents and the dynamic maneuver of mobile structure 101.

In various embodiments, the environmental medium through which mobile structure 101 travels may generally be air or water, or a mixture of the two. In embodiments where the medium is water, mobile structure 101 may generally be implemented as a watercraft, and controller 130 may be configured to use a determined STM sensor calibration and/or a leeway calibration to determine a localized water current. For example, controller 130 may be configured to use the relationships described herein between the medium current, SOG velocity, STM velocity, and/or leeway velocity to determine the localized medium current, for example, and/or to determine a plurality of localized medium currents that, in some embodiments, may be combined to create a water current chart.

Embodiments of the present disclosure can thus provide reliable and accurate STB sensor calibration for mobile structures. Such embodiments may be used to assist in the operation of various systems, devices, and/or sensors coupled to or associated with mobile structure 101, such as navigation control system 190 in FIG. 1A, as described herein. Moreover, such embodiments may be employed to reliably and accurately map air and/or water currents while underway and without necessitating stopping travel or using a stationary sensor.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
receiving longitudinal speeds of a mobile structure through an environmental medium from a speed through medium (STM) sensor, absolute orientations of the mobile structure from an orientation sensor, and absolute positions and/or Doppler-derived velocities of the mobile structure from a position sensor;

determining a first time series of estimated STM velocities of the mobile structure based, at least in part, on the longitudinal speeds provided by the STM sensor and the absolute orientations provided by the orientation sensor during a dynamic maneuver of the mobile structure;

determining a second time series of speed over ground (SOG) velocities of the mobile structure based, at least in part, on position sensor data provided by the position sensor during the dynamic maneuver of the mobile structure;

determining an STM sensor calibration associated with the STM sensor based, at least in part, on the first time series of estimated STM velocities and the second time series of SOG velocities; and calibrating the STM sensor based on the STM sensor calibration.

2. The method of claim 1, wherein the determining the STM sensor calibration comprises:

determining a third time series of estimated medium currents based, at least in part, on the first series of estimated STM velocities and the second series of SOG velocities; and determining the STM sensor calibration that minimizes a medium current variance associated with the third time series of estimated medium currents and the dynamic maneuver of the mobile structure.

3. The method of claim 2, further comprising:

determining a localized medium current corresponding to the dynamic maneuver of the mobile structure based, at least in part, on the STM sensor calibration.

4. The method of claim 1, wherein the determining the STM sensor calibration comprises:

segregating the first time series of estimated STM velocities and the second time series of SOG velocities into a plurality of speed bands associated with the longitudinal speeds of the mobile structure; and determining the STM sensor calibration based, at least in part, on the first time series of estimated STM velocities, the second time series of SOG velocities, and the plurality of speed bands, wherein the STB sensor calibration comprises a plurality of calibration gains corresponding to the plurality of speed bands.

5. The method of claim 4, wherein:

the STM sensor calibration comprises a calibration curve based, at least in part, on the plurality of calibration gains and the plurality of speed bands.

6. The method of claim 1, further comprising:

detecting initiation of the dynamic maneuver of the mobile structure and/or verifying an operational status of the orientation sensor prior to the determining the first time series of estimated STM velocities and the determining the second time series of SOG velocities.

7. The method of claim 1, further comprising:

detecting the STM sensor calibration is outside a threshold variance relative to a prior STM sensor calibration; and controlling a user interface associated with the mobile structure to generate an audible and/or visible calibration excursion alert for presentation to a user of the mobile structure.

8. The method of claim 1, wherein the orientation sensor is configured to provide a heel angle of the mobile structure, the method further comprising:

determining a third time series of leeway velocities based, at least in part, on the longitudinal speeds provided by the STM sensor, the absolute orientations provided by the orientation sensor, and heel angles provided by the orientation sensor during the dynamic maneuver of the mobile structure; and determining the STM sensor calibration associated with the STM sensor and a leeway calibration associated with the mobile structure based, at least in part, on the first time series of estimated STM velocities, the second time series of SOG velocities, and the third time series of leeway velocities.

9. The method of claim 8, wherein the determining the STM sensor calibration and the leeway calibration comprises:

determining a fourth time series of estimated medium currents based, at least in part, on the first series of estimated STM velocities and the second series of SOG velocities; and determining the STM sensor calibration and the leeway calibration that minimizes a medium current variance associated with the fourth time series of estimated medium currents and the dynamic maneuver of the mobile structure.

10. The method of claim 9, wherein the medium comprises water and the mobile structure comprises a watercraft, the method further comprising:

determining a localized water current corresponding to the dynamic maneuver of the watercraft based, at least in part, on the STM sensor calibration and the leeway calibration.

11. A system comprising:

a logic device configured to communicate with a speed through medium (STM) sensor configured to provide a longitudinal speed of a mobile structure through an environmental medium, an orientation sensor configured to provide an absolute orientation of the mobile structure, and a position sensor configured to provide an absolute position and/or Doppler-derived velocity of the mobile structure, wherein the logic device is configured to:

determine a first time series of estimated STM velocities of the mobile structure based, at least in part, on longitudinal speeds provided by the STM sensor and absolute orientations provided by the orientation sensor during a dynamic maneuver of the mobile structure;

determine a second time series of speed over ground (SOG) velocities of the mobile structure based, at least in part, on position sensor data provided by the position sensor during the dynamic maneuver of the mobile structure;

determine an STM sensor calibration associated with the STM sensor based, at least in part, on the first time series of estimated STM velocities and the second time series of SOG velocities; and calibrate the STM sensor based on the STM sensor calibration.

12. The system of claim 11, wherein the determining the STM sensor calibration comprises:

determining a third time series of estimated medium currents based, at least in part, on the first series of estimated STM velocities and the second series of SOG velocities; and determining the STM sensor calibration that minimizes a medium current variance associated with the third time series of estimated medium currents and the dynamic maneuver of the mobile structure.

13. The system of claim 12, wherein the logic device is configured to:

determine a localized medium current corresponding to the dynamic maneuver of the mobile structure based, at least in part, on the STM sensor calibration.

14. The system of claim 11, wherein the determining the STM sensor calibration comprises:
   segregating the first time series of estimated STM velocities and the second time series of SOG velocities into a plurality of speed bands associated with the longitudinal speeds of the mobile structure; and
   determining the STM sensor calibration based, at least in part, on the first time series of estimated STM velocities, the second time series of SOG velocities, and the plurality of speed bands, wherein the STB sensor calibration comprises a plurality of calibration gains corresponding to the plurality of speed bands.

15. The system of claim 14, wherein:
   the STM sensor calibration comprises a calibration curve based, at least in part, on the plurality of calibration gains and the plurality of speed bands.

16. The system of claim 11, wherein the logic device is configured to:
   detect initiation of the dynamic maneuver of the mobile structure and/or verify an operational status of the orientation sensor prior to the determining the first time series of estimated STM velocities and the determining the second time series of SOG velocities.

17. The system of claim 11, wherein the logic device is configured to:
   detect the STM sensor calibration is outside a threshold variance relative to a prior STM sensor calibration; and
   control a user interface associated with the mobile structure to generate an audible and/or visible calibration excursion alert for presentation to a user of the mobile structure.

18. The system of claim 11, wherein the orientation sensor is configured to provide a heel angle of the mobile structure, and wherein the logic device is configured to:
   determine a third time series of leeway velocities based, at least in part, on the longitudinal speeds provided by the STM sensor, the absolute orientations provided by the orientation sensor, and heel angles provided by the orientation sensor during the dynamic maneuver of the mobile structure; and
   determine the STM sensor calibration associated with the STM sensor and a leeway calibration associated with the mobile structure based, at least in part, on the first time series of estimated STM velocities, the second time series of SOG velocities, and the third time series of leeway velocities.

19. The system of claim 18, wherein the determining the STM sensor calibration and the leeway calibration comprises:
   determining a fourth time series of estimated medium currents based, at least in part, on the first series of estimated STM velocities and the second series of SOG velocities; and
   determining the STM sensor calibration and the leeway calibration that minimizes a medium current variance associated with the fourth time series of estimated medium currents and the dynamic maneuver of the mobile structure.

20. The system of claim 19, wherein the medium comprises water, the mobile structure comprises a watercraft, and the logic device is configured to:
   determine a localized water current corresponding to the dynamic maneuver of the watercraft based, at least in part, on the STM sensor calibration and the leeway calibration.

* * * * *

UNITED STATES PATENT AND TRADEMARK OFFICE
CERTIFICATE OF CORRECTION

| | |
|---|---|
| PATENT NO. | : 11,486,989 B2 |
| APPLICATION NO. | : 16/823132 |
| DATED | : November 1, 2022 |
| INVENTOR(S) | : Mark Johnson |

Page 1 of 1

It is certified that error appears in the above-identified patent and that said Letters Patent is hereby corrected as shown below:

In the Specification

In the Detailed Description:

In Column 10, Line 36, change "angle αmeasured relative" to --angle α measured relative--.

Signed and Sealed this
Twenty-seventh Day of December, 2022

Katherine Kelly Vidal
*Director of the United States Patent and Trademark Office*